United States Patent Office 2,779,756
Patented Jan. 29, 1957

2,779,756
METALLIFEROUS TRISAZO DYESTUFFS

Henri Riat, Arlesheim, Switzerland, assignor to Ciba Limited, Basel, Switzerland, a Swiss firm No Drawing. Application February 15, 1954,
Serial No. 410,440

Claims priority, application Switzerland February 26, 1953

10 Claims. (Cl. 260—147)

This invention provides metalliferous triazodyestuffs which, for example, like the dyestuff of the formula (1)
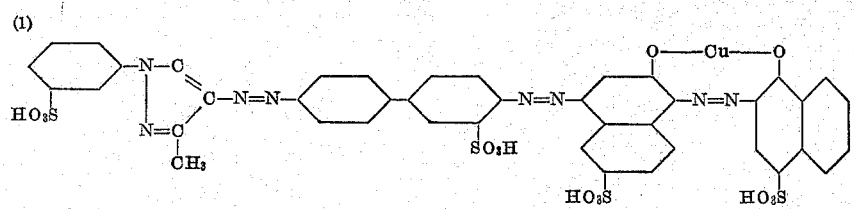

correspond to the general formula (2)
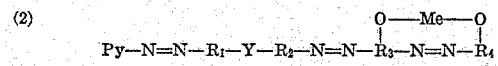

in which Me represents a nickel or copper atom bound in complex union, Y represents a —CH=CH— group or a direct bond, Py represents a pyrazolone radical, $R_1$ and $R_2$ represent benzene radicals, $R_3$ represents an aromatic radical containing at the most 10 aryl carbon atoms, viz. a benzene or naphthalene radical bound in para-position to the azo-linkages, and $R_4$ represents the radical of an end component of the naphthalene series, and in which the azo linkages bound to $R_1$ and $R_2$ are in para-position relatively to Y and the —O—Me—O— group is connected to each of the radicals $R_3$ and $R_4$ in a position vicinal to the azo linkage.

The invention also provides a process for making the metalliferous dyestuffs of the above general formula, wherein a trisazo-dyestuff of the formula (3)
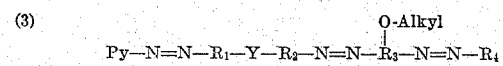

in which the —O—alkyl group is in ortho-position relatively to the —N=N—$R_4$ group,
Y represents a —CH=CH— group or a direct bond,
Py represents a pyrazolone radical,
$R_1$ and $R_2$ represent benzene radicals,
$R_3$ represents a benzene or naphthalene radical bound in para-position to the azo linkages, and
$R_4$ represents the radical of an end component of the naphthalene series containing a hydroxyl group in a position vicinal to the azo linkage and in which the azo linkages bound to $R_1$ and $R_2$ occupy para-positions relatively to Y, is treated with an agent yielding a metal having an atomic number ranging from 28 to 29, viz. an agent yielding nickel or copper in such manner that an ortho:ortho'-dihydroxy-metal complex is formed accompanied by the splitting off of the alkoxy group of ortho-hydroxy-ortho'-alkoxy-grouping.

The starting materials of the Formula 3 preferably contain at least three sulfonic acid groups. They can be made in various ways, for example, a tetrazo compound of a diamine of the formula (4) 

may be coupled on the one hand with a pyrazolone and on the other with a middle component

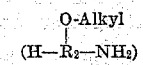

which contains an alkoxy group in ortho-position to the amino group, further diazotizing the resulting amino-disazo-dyestuff, and coupling the diazo-disazo-compound with an end component of the naphthalene series capable of coupling in a position vicinal to a hydroxyl group.

Furthermore, the amino-disazo-dyestuffs used as intermediate dyestuffs and corresponding to the formula (5)
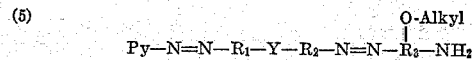

can in some cases be made with advantage by diazotizing a compound of the formula (6) 

in which one A represents a —$NH_2$ group and the other A represents a substituent convertible into such group, for example, a nitro or acylamino group, and coupling the diazo compound with a pyrazolone, and then converting the said substituent into the —$NH_2$ group, diazotizing the amino-monoazo-dyestuff and coupling with a middle component.

Furthermore, diamines of the Formula 4 which are diazotized on one side, when such diazo-compounds are accessible, may be coupled with pyrazolones, and then the resulting amino-monoazo-dyestuffs are further diazotized and coupled with the middle components to form the amino-disazo-dyestuffs of the Formula 5. Another method for making the dyestuffs of the Formula 3 consists in diazotizing a compound of the Formula 6, coupling the diazo compound with a middle component of the kind described above, further diazotizing the amino-monoazo-dyestuff so obtained, and coupling the diazo-azo-compound with an end component of the naphthalene series capable of coupling in a position vicinal to a hydroxyl group, then converting the substituent A into the amino group, diazotizing and coupling with a pyrazolone.

As diamines of the Formula 4 there are used compounds which contain two benzene radicals bound together by a direct bond or by a —CH=CH— group, each of the benzene radicals containing an amino group as a substituent in para-position to Y. The benzene radicals may also contain further substituents, for example, halogen atoms such as chlorine, alkyl groups such as methyl, alkoxy groups such as ethoxy or methoxy, or sulfonic acid groups. As examples there may be mentioned the following diamines:

4:4'-diaminodiphenyl,
3:3'-dimethyl- or 3:3'-dichloro-4:4'-diaminodiphenyl,
4:4'-diaminodiphenyl-3-sulfonic acid,
4:4'-diaminodiphenyl-3:3'-disulfonic acid and
4:4'-diaminostilbene-2:2'-disulfonic acid.

The above statements in connection with the diamines of the Formula 4 apply mutatis mutandis to the compounds of the Formula 6. As examples of the latter compounds there may be mentioned:

4-amino-4'-acetylaminodiphenyl,
4-amino-4'-acetylaminodiphenyl-3-sulfonic acid and
4-nitro-4'-aminostilbene-2:2'-disulfonic acid.

Any desired pyrazolones may be used for preparing the starting dyestuffs. Thus, for example, there may be used 3-methyl-5-pyrazolone, 1-alkyl-3-methyl-5-pyrazolone, and especially 1-phenyl-3-methyl-5-pyrazolone or a 1-aryl-3-methyl-5-pyrazolone of which the aryl radical may contain further substituents. As examples there may be mentioned 1-(4'-methylphenyl)-3-methyl-5-pyrazolone and 1-(4'-chlorophenyl)-3-methyl-5-pyrazolone. Pyrazolones which contain, advantageously in a phenyl radical bound in the 1-position of the pyrazolone ring, groups imparting solubility such, for example, as carboxylic acid groups, sulfonic acid groups or if desired sulfonic acid amide groups, are of special interest in the case of dyestuffs which would otherwise contain only a few groups imparting solubility. In this connection there may be mentioned as examples: 1-phenyl-5-pyrazolone-3-carboxylic acid, 1-phenyl-3-methyl-5-pyrazolone-3'- or -4'-sulfonic acid, 1-(4'-methylphenyl)-3-methyl-5-pyrazolone-3'-sulfonic acid, 1-(2'-chlorophenyl)-3-methyl-5-pyrazolone-4'-sulfonic acid, 1-phenyl-3-methyl-5-pyrazolone-4'-carboxylic acid, 1-phenyl-5-pyrazolone-3-carboxylic acid-3'-sulfonic acid and 1-phenyl-3-methyl-5-pyrazolone-3'-sulfonic acid amide.

The middle components of the formula

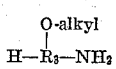

contain the -O-alkyl group, for example, an ethoxy group or advantageously a methoxy group capable of forming metal complexes in ortho-position to the amino group. There may be used the middle components of the benzene series and especially those of the naphthalene series such, for example, as 1-amino-2-methoxy-5-methylbenzene, 1-amino-2-methoxybenzene, 1-amino-2:5-dimethoxybenzene, 1-amino-2:5-diethoxybenzene, 1-amino-2-methoxy-5-ethoxy-benzene, 1-amino-2-ethoxy-5-methoxybenzene, 1-amino-2-methoxynaphthalene, 1-amino-2-ethoxynaphthalene, 1-amino-2-methoxynaphthalene-6-sulfonic acid, 1-amino-2-methoxynaphthalene-7-sulfonic acid and 1-amino-2-ethoxynaphthalene-6- or -7-sulfonic acid.

As end components (H—R4) there came into consideration compounds of the naphthalene series capable of coupling in a position vicinal to a hydroxyl group, such as hydroxy-naphthalene sulfonic acids and especially amino-hydroxynaphthalene sulfonic acids containing substituted amino groups, for example, arylamino groups or acylamino groups. As examples there may be mentioned 2-hydroxynaphthalene,
2-hydroxynaphthalene-6-sulfonic acid,
2-hydroxynaphthalene-3:6-disulfonic acid,
1-hydroxynaphthalene-4-sulfonic acid,
1-hydroxynaphthalene-3:6- or -3:8-disulfonic acid,
1:8-dihydroxynaphthalene-3:6-disulfonic acid,
1-amino-5-hydroxynaphthalene-7-sulfonic acid,
1-amino-8-hydroxynaphthalene-4-sulfonic acid,
2-amino-5-hydroxynaphthalene-7-sulfonic acid,
2-amino-8-hydroxynaphthalene-6-sulfonic acid,
2-amino-6-hydroxynaphthalene-8-sulfonic acid,
nitrogen-substituted 2-amino-5-hydroxynaphthalene-7-sulfonic acid such as 2-acetylamino-5-hydroxynaphthalene-7-sulfonic acid,
2-benzoylamino-5-hydroxynaphthalene-7-sulfonic acid,
2-(4'-chlorobenzoylamino)-5-hydroxynaphthalene-7-sulfonic acid,
2-phenylamino-5-hydroxynaphthalene-7-sulfonic acid,
2-(2'- or 4'-methoxyphenylamino)-5-hydroxynaphthalene-7-sulfonic acid,
2-(3'- or 4'-carboxymethoxyphenylamino)-5-hydroxynaphthalene-7-sulfonic acid,
2-(4'-methylphenylamino)-5-hydroxynaphthalene-7:3'-disulfonic acid,
2-(4'-chlorophenylamino)-5-hydroxynaphthalene-7:3'-disulfonic acid and
2-phenylamino-5-hydroxynaphthalene-7:3'- or -7:4'-disulfonic acid.

The dyestuffs of the Formula 3 can be made by the usual known methods. The tetrazotized diamines of the Formula 4 are advantageously coupled first in a weakly acid medium with the pyrazolone and then in a weakly acid to weakly alkaline medium with the middle component. Coupling with the end components is advantageously carried out in an alkaline medium and in the presence of pyridine or picoline.

As agents yielding metal for use in the process of the invention there come into consideration agents yielding nickel or advantageously agents yielding copper, and the treatment with the agent yielding metal is carried out in such manner that an ortho:ortho'-dihydroxy-azo-copper complex is formed. Thus, for example, the metallization may be carried out with a salt of divalent copper or nickel in a weakly acid aqueous medium. However, the dyestuffs may be metallized by the method in itself known in which there is used a nickel or copper tetrammine complex in the presence or absence of an excess of an amine or ammonia, the metallization being advantageously carried out in an aqueous medium in the vicinity of 100° C. for several hours. Of special advantage in some cases of this kind is the process of U. S. Patent No. 2,536,957, filed October 8, 1947, in which the metallization is carried out in the presence of a hydroxyalkylamine, especially ethanolamine, or a copper complex derived therefrom.

It is generally of advantage to copper dyestuffs of the general Formula 3, in which the radical R3 is a naphthalene radical, for example, dyestuffs in which the radical R3 corresponds to the formula

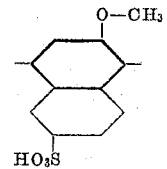

with copper sulfate with the addition of an alkali acetate.

On the other hand, it has been found advantageous to convert into ortho:ortho-dihydroxy-copper complexes with the aid of copper tetrammine sulfates those dyestuffs which contain at the aforesaid position in the molecule an alkoxy-benzene radical, for example of one of the formulae

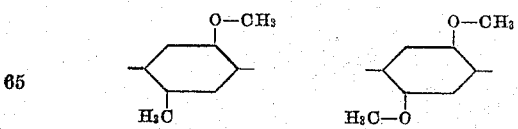

and

The metalliferous azo dyestuffs of this invention are new and correspond to the above Formula 2. This formula no doubt represents the correct stoichiometric proportions of metal and the correct position of the metal atom in the complex, but the distribution of the main and secondary valences in the complex union of the metal has not yet been ascertained with certainty.

The new metalliferous, especially cupriferous, dyestuffs of the Formula 2 can be used for dyeing and printing a very wide variety of materials such as wool, silk, and especially cellulose containing fibers such as cotton, linen and also artificial silk and staple fibers of regenerated cellulose. There are usually produced level grey to olive green dyeings of good fastness to light, which withstands an ordinary anti-creasing treatment, for example, by means of urea-formaldehyde resins. In dyeing cellulose-containing materials by the usual direct dyeing methods other fibers, for example, fibers of cellulose esters, are not dyed.

The following examples illustrate the invention, the parts and percentages being by weight:

Example 1

26.4 parts of 4:4'-diaminodiphenyl-3-sulfonic acid are tetrazotized in the usual manner. After the addition of 40 parts of crystalline sodium acetate to the diazo-suspension, a neutral solution of 26 parts of 1-phenyl-3-methyl-5-pyrazolone-3'-sulfonic acid is run in. When the intermediate compound has been formed, the mixture is rendered neutral to weakly alkaline with sodium carbonate, and coupling is carried out with a neutral solution of 25 parts of 1-amino-2-methoxynaphthalene-6-sulfonic acid. When the coupling is finished the disazo-dyestuff is separated, stirred into 1000 parts of water, and then diazotized at 10–15° C. by the addition of 40 parts of concentrated hydrochloric acid and 7 parts of sodium nitrite. The diazo-compound so obtained is then introduced into an ice cold solution of 28 parts of 2-acetylamino-5-hydroxynaphthalene-7-sulfonic acid and 30 parts of anhydrous sodium carbonate in 300 parts of water and 150 parts of pyridine (or picoline). When the coupling is finished, the dyestuff is salted out and filtered off.

The moist filter cake of the trisazo-dyestuff is dissolved in 2000 parts of warm water. After the addition of 25 parts of crystalline sodium acetate and 25 parts of crystalline copper sulfate, the whole is heated for 10 hours at the boil under reflux.

The copper complex formed is precipitated by the addition of 200 parts of sodium chloride, filtered and dried. The dyestuff is a dark powder which dissolves in water with an olive coloration and dyes cotton olive tints of remarkable fastness to light.

By using, instead of copper sulfate, the corresponding quantity of nickel sulfate for converting the dyestuff into a complex metal compound, there is obtained a nickeliferous dyestuff which dyes cotton green-grey tints.

In the following table are given further valuable dyestuffs which are obtained in the manner described above by coupling tetrazotized 4:4'-diaminodiphenyl-3-sulfonic acid first with the pyrazolone given in column I and then with the middle component given in column II, further diazotizing the resulting amino-disazo-dyestuff and coupling the diazo compound with the end component given in column III, and finally converting the trisazo-dyestuff so obtained into its ortho:ortho'-dioxy-azo-copper complex:

|  | I Pyrazolone | II Middle component | III End component | Tint of dyeing of the copper compound on cotton |
|---|---|---|---|---|
| 1 | 1-phenyl-3-methyl-5-pyrazolone-3'-sulfonic acid. | 1-amino-2-methoxy-naphthalene-6-sulfonic acid. | 2-benzoylamino-5-hydroxynaphthalene-7-sulfonic acid. | olive. |
| 2 | ....do............ | ....do............ | 1-benzoylamino-8-hydroxy-naphthalene-4-sulfonic acid. | Do. |
| 3 | ....do............ | ....do............ | 2-benzoylamino-6-hydroxy-naphthalene-8-sulfonic acid. | Do. |
| 4 | ....do............ | ....do............ | 1-acetylamino-8-hydroxynaph-thalene-4-sulfonic acid. | Do. |
| 5 | ....do............ | ....do............ | 1-hydroxynaph-thalene-4-sulfonic acid. | Do. |
| 6 | ....do............ | ....do............ | 2-hydroxynaph-thalene-6-sulfonic acid. | Do. |
| 7 | ....do............ | ....do............ | 2-hydroxynaph-thalene. | Do. |
| 8 | ....do............ | 1-amino-2-ethoxynaphtha-lene-6-sulfonic acid. | 1-acetylamino-8-hydroxy-naphthalene-4-sulfonic acid. | Do. |
| 9 | ....do............ | 1-amino-2-methoxynaphtha-lene-6-sulfonic acid. | 2-phenylamino-5-hydroxy-naphthalene-7-sulfonic acid. | greenish olive. |
| 10 | 1-phenyl-3-methyl-5-pyrazolone-4'-sulfonic acid. | ....do............ | 2-phenylamino-5-hydroxy-naphthalene-7-sulfonic acid-3'-carboxylic acid. | Do. |
| 11 | 1-phenyl-5-pyrazolone-3-carboxylic acid. | ....do............ | 2-acetylamino-5-hydroxynaph-thalene-7-sulfonic acid. | grey. |
| 12 | 1-phenyl-5-pyrazolone-3-carboxylic acid-3'-sulfonic acid. | ....do............ | 2-benzoylamino-5-hydroxy-naphthalene-7-sulfonic acid. | greenish grey. |
| 13 | 1-(4'-methyl-phenyl)-3-methyl-5-pyrazolone-3'-sulfonic acid. | ....do............ | 2-hydroxynaph-thalene-6-sulfonic acid. | olive. |
| 14 | 1-(2'-chloro-phenyl)-3-methyl-5-pyrazolone-4'-sulfonic acid. | ....do............ | 1-hydroxynaph-thalene-4-sulfonic acid. | Do. |
| 15 | 1-phenyl-3-methyl-5-pyrazolone-4'-carboxylic acid | ....do............ | 2-acetylamino-5-hydroxynaph-thalene-7-sulfonic acid. | Do. |
| 16 | 1-phenyl-3-methyl-5-pyrazolone-3'-sulfonic acid. | 1-amino-2-methoxy-naphthalene. | 1-hydroxynaph-thalene-4-sulfonic acid. | Do. |
| 17 | 1-phenyl-3-methyl-5-pyrazolone-4'-sulfonic acid. | 1-amino-2-methoxynaphtha-lene-6-sulfonic acid. | 2-acetylamino-5-hydroxynaph-thalene-7-sulfonic acid. | Do. |
| 18 | 1-phenyl-3-methyl-5-pyrazolone-3'-sulfonic acid. | 1-amino-2-methoxynaphtha-lene-7-sulfonic acid. | 2-benzoylamino-5-hydroxy-naphthalene-7-sulfonic acid. | Do. |

The dyestuffs Nos. 4, 5, 6 and 17 correspond to the following formulae:

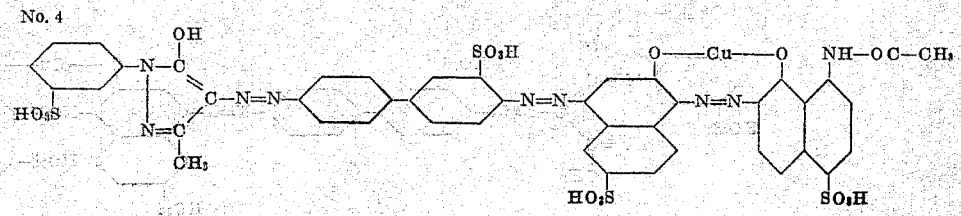

No. 4

No. 5
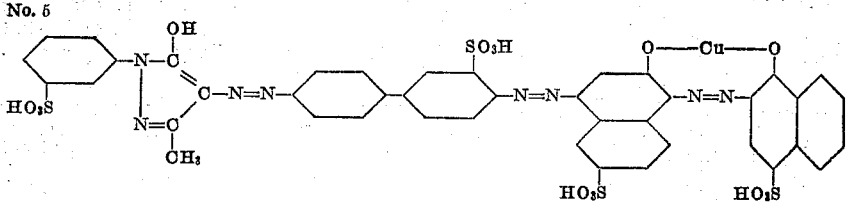

No. 6
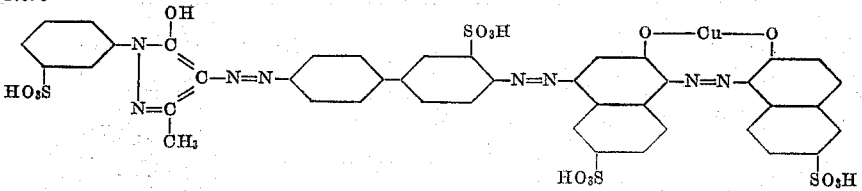

No. 17
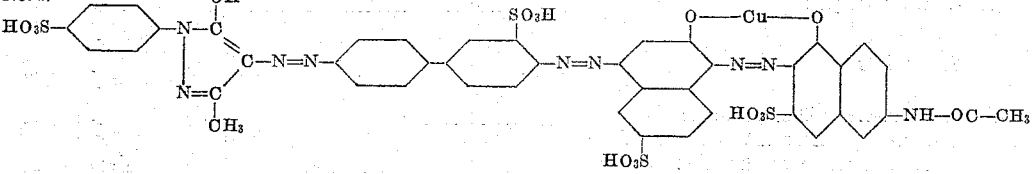

*Example 2*

40 parts of 4-nitro-4'-aminostilbene-2:2'-disulfonic acid are diazotized in the usual manner. The diazo-compound is coupled in the presence of sodium bicarbonate with 25 parts of 1-phenyl-3-methyl-5-pyrazolone-4'-sulfonic acid. The nitro group is reduced to the amino group at 35–40° C. with 42 parts of crystalline sodium sulfide, and the amino-azo-dyestuff is completely precipitated by acidification and admixture with sodium chloride, and filtered off. The dyestuff is diazotized in 1000 parts of water at 10–15° C. with 30 parts of concentrated hydrochloric acid and 7 parts of sodium nitrite. The diazo-compound is filtered off and added to a solution of 25 parts of 1-amino-2-methoxy-naphthalene-6-sulfonic acid, 4 parts of sodium hydroxide and 20 parts of crystalline sodium acetate. After the coupling, the mixture is rendered alkaline with sodium carbonate and heated to 90° C. By the addition of 25 parts of sodium chloride to every 100 parts of solution the dyestuff is precipitated in an easily filterable form. It is then filtered off, stirred in 1000 parts of water, acidified with 40 parts of concentrated hydrochloric acid and diazotized at 10–15° C. with 8 parts of sodium nitrite dissolved in 50 parts of water. The diazo compound is coupled with 28 parts of 2-acetylamino-5-hydroxynaphthalene-7-sulfonic acid in a solution rendered alkaline with sodium carbonate in the presence of 150 parts of a mixture of pyridine bases. The trisazo-dyestuff is filtered off and washed with sodium chloride solution of 5 percent strength.

The dyestuff paste is dissolved in 2000 parts of warm water, and mixed with a solution of 25 parts of crystalline copper sulfate and 50 parts of an ammonia solution of 25 percent strength. The whole is heated for 12 hours at 90–95° C. under reflux, and the copper complex is isolated by the addition of sodium chloride followed by filtration. When dry, the resulting dyestuff is a dark powder which dissolves in water with an olive coloration and dyes cotton grey-olive tints which are fast to light.

Similar dyestuffs are obtained by using as end component 2-benzoylamino-5-hydroxynaphthalene-7-sulfonic acid and/or 1-phenyl-3-methyl-5-pyrazolone-3'-sulfonic acid, instead of 1-phenyl-3-methyl-5-pyrazolone-4'-sulfonic acid.

*Example 3*

30.6 parts of 4-amino-4'-acetylaminodiphenyl-3-sulfonic acid are diazotized in the usual manner. The diazo compound is coupled with 26 parts of 1-phenyl-3-methyl-5-pyrazolone-4'-carboxylic acid in a solution rendered alkaline with sodium carbonate. The acetyl group is then split off by heating with a sodium hydroxide solution of 4 percent strength, and the amino-azo-dyestuff is further diazotized, after neutralizing the excess of sodium hydroxide. The diazo-compound is coupled in an acetic acid solution with 25 parts of 1-amino-2-methoxynaphthalene-6-sulfonic acid. The amino-disazo-dyestuff formed is separated, dissolved in water, acidified with 40 parts of concentrated hydrochloric acid, and diazotized at 10–20° C. by the addition of 7 parts of sodium nitrite dissolved in 50 parts of water. The diazo-compound is then coupled in a solution rendered alkaline with sodium carbonate and in the presence of 200 parts of pyridine with 28 parts of 2-acetylamino-5-hydroxynaphthalene-7-sulfonic acid. The trisazo-dyestuff is isolated, and converted into its copper complex by the method described in Example 1. The copper complex dyes cotton green-olive tints which are fast to light.

By using, instead of 2-acetylamino-5-hydroxynaphthalene-7-sulfonic acid, the corresponding quantity of 2-benzoylamino-5-hydroxynaphthalene-7-sulfonic acid or 1-hydroxynaphthalene-4-sulfonic acid, there are obtained dyestuffs having similar properties.

By using, instead of 1-phenyl-3-methyl-5-pyrazolone-3'-sulfonic acid, 1-phenyl-3-methyl-5-pyrazolone there is obtained a dyestuff which dyes cotton olive-green tints.

Finally, by using, instead of 1-phenyl-3-methyl-5-pyrazolone-4'-carboxylic acid, 1-phenyl-3-methyl-5-pyrazolone-3'-sulfonic acid there is obtained a dyestuff which corresponds to the formula

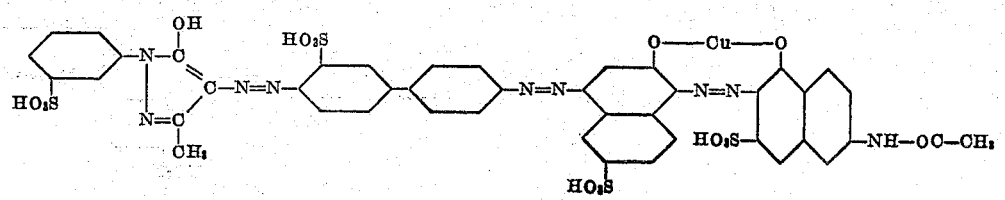

which possesses properties similar to those of the dyestuff obtained as described in the first three paragraphs of Example 1.

*Example 4*

25.6 parts of 4-amino-4'-carboxy-carboylaminodiphenyl are stirred in 400 parts of water, acidified with 25 parts of concentrated hydrochloric acid and diazotized at 20–30° C. with a solution of 6.9 parts of sodium nitrite in 50 parts of water. The diazo compound is coupled with 26 parts of 1-phenyl-5-pyrazolone-3-carboxylic acid-4'-sulfonic acid in a solution rendered alkaline with sodium carbonate. After the coupling the monoazo-dyestuff is isolated and heated for 2 hours at 90° C. with a solution of sodium hydroxide of 4% strength for the purpose of splitting off the oxalic acid residue. The aminoazo-dyestuff is isolated, suspended in 1000 parts of water, admixed with 7 parts of sodium nitrite and diazotized at 15° C. by rapidly adding 40 parts of concentrated hydrochloric acid. The diazo compound is filtered off, stirred in 1000 parts of water and after the addition of 30 parts of sodium acetate is mixed with a neutral solution of 25 parts of 1-amino-2-methoxynaphthalene-6-sulfonic acid. After the coupling the disazo-dyestuff is separated and further diazotized. The diazo compound is coupled with 34 parts of 2-benzoylamino-5-hydroxynaphthalene-7-sulfonic acid in a solution rendered alkaline with sodium carbonate and in the presence of 200 parts of pyridine. The dyestuff is isolated and converted into its copper complex by the method described in Example 2. After working up in the usual way a dark powder is obtained which dissolves in water with a violet-grey tint and dye cotton grey shades which are fast to light.

By using instead of 1-phenyl-5-pyralozone-3-carboxylic acid-4'-sulfonic acid, 1-phenyl-3-methyl-5-pyralozone-4'-sulfonic acid and instead of 2-benzoylamino-5-hydroxynaphthalene-7-sulfonic acid, 2-acetylamino-5-hydroxynaphthalene-7-sulfonic acid there is obtained a dyestuff which dyes cotton olive tints.

If the final coupling in the above example is carried out with 28 parts of 2-acetylamino-5-hydroxynaphthalene-7-sulfonic acid, there is obtained a dyestuff which possesses similar properties.

*Example 5*

The diazo compound from 30.6 parts of 4-amino-4'-acetyl-aminodiphenyl-3-sulfonic acid is coupled with 26 parts of 1-phenyl-5-pyrazolone-3-carboxylic acid-4'-sulfonic acid in a solution rendered alkaline with sodium carbonate. The monoazo-dyestuff is treated with a solution of sodium hydroxide of 4 percent strength until the acetyl group is completely split off. The resulting aminoazo-dyestuff is diazotized and the diazo compound is coupled with 13.7 parts of 1-amino-2-methoxy-5-methylbenzene in an acetic acid medium. The disazo-dyestuff is isolated in an acid state and further diazotized, whereupon the diazo compound is entered into a solution of 28 parts of 2-acetylamino-5-hydroxynaphthalene-7-sulfonic acid, 30 parts of sodium carbonate and 50 parts of pyridine. After the coupling the dyestuff is isolated, dissolved in 2000 parts of water and mixed with a solution of 25 parts of crystalline copper sulfate and 100 parts of ammonia of 25 percent strength. The whole is heated for 10 hours at 90–95° C. and the cupriferous dyestuff is isolated in the usual way. It dissolves in water with a violet-grey color and dyes cotton grey tints which are fast to light.

A dyestuff with similar properties is obtained when 2-benzoylamino-5-hydroxynaphthalene-7-sulfonic acid is used for the final coupling.

*Example 6*

100 parts of cotton are entered at 40° C. into a dyebath which contains, in 3000 parts of water, 1 part of the dyestuff obtained as described in the first three paragraphs of Example 1. Dyeing is carried on for ½ hour while the temperature is raised to 90° C., 30 parts of crystalline sodium sulfate are added, and dyeing is continued for a further ½ hour at 90–95° C. The cotton is then rinsed and dried. There is obtained an olive dyeing of very good fastness to light.

What is claimed is:

1. A metalliferous trisazo dyestuff containing at least three sulfonic acid groups and corresponding to the formula

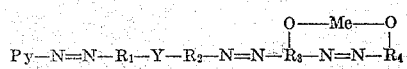

in which Me represents a metal having an atomic number ranging from 28 to 29 and being bound in complex union, $-R_1-Y-R_2-$ represents a member selected from the group consisting of radicals of the formulae

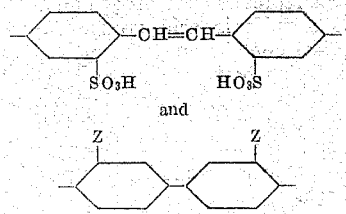

wherein one Z represents a hydrogen atom and the other Z represents a sulfonic acid group, Py represents a pyrazolone radical, $R_3$ represents an aromatic radical containing at the most 10 aryl carbon atoms and carrying both azo groups attached thereto in para-position to one another, and $R_4$ represents the radical of an end component of the naphthalene series, and in which formula the azo linkages bound to $R_1$ and $R_2$ are in para-position relatively to Y and the $-O-Me-O-$ group is connected to each of the radicals $R_3$ and $R_4$ in a position vicinal to the azo linkage.

2. A metalliferous trisazo dyestuff containing at least three sulfonic acid groups and corresponding to the formula

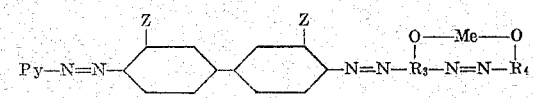

in which Me represents a metal atom having an atomic number ranging from 28 to 29 and bound in complex union, one Z represents a hydrogen atom and the other Z represents a sulfonic acid group, Py represents the radical of a 1-phenyl-5-pyrazolone bound to the azo linkage in its 4-position, $R_3$ represents an aromatic radical containing at the most 10 aryl carbon atoms and carrying both azo groups attached thereto in para-position to one another, and $R_4$ represents the radical of an end component of the naphthalene series, and in which formula the azo linkages bound to $R_1$ and $R_2$ are in para-position relatively to Y and the $-O-Me-O-$ group is connected to each of the radicals $R_3$ and $R_4$ in a position vicinal to the azo linkage.

3. A metalliferous trisazo dyestuff containing at least three sulfonic acid groups and corresponding to the formula

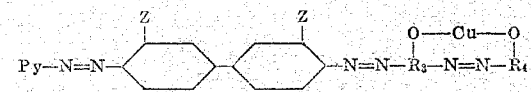

in which one Z represents a hydrogen atom and the other Z a sulfonic acid group, Py represents the radical of a 1-phenyl-5-pyrazolone bound to the azo linkage in its 4-position, $R_3$ represents an aromatic radical containing at the most 10 aryl carbon atoms and carrying both azo groups attached thereto in para-position to one another, and $R_4$ represents the radical of an end component of the naphthalene series, and in which formula the $-O-Cu-O-$ group is connected to each of the radicals $R_3$ and $R_4$ in a position vicinal to the azo linkage.

4. A metalliferous trisazo dyestuff containing at least three sulfonic acid groups and corresponding to the formula

in which one Z represents a hydrogen atom and the other Z represents a sulfonic acid group, R₃ represents an aromatic radical containing at the most 10 aryl carbon atoms and carrying both azo groups attached thereto in para-position to one another, and R₄ represents the radical of an end component of the naphthalene series, and in which formula the —O—Cu—O— group is connected to each of the radicals R₃ and R₄ in a position vicinal to the azo linkage.

5. A metalliferous trisazo dyestuff of the formula

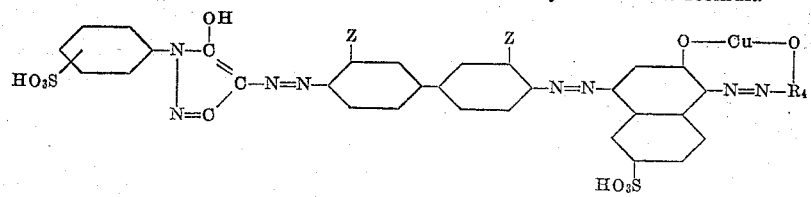

in which one Z represents a hydrogen atom and the other Z represents a sulfonic acid group and R₄ represents the radical of an end component of the naphthalene series containing a sulfonic acid group and to which radical the azo group and the —O—Cu—O— group are attached in adjacent position.

6. The metalliferous trisazo dyestuff of the formula

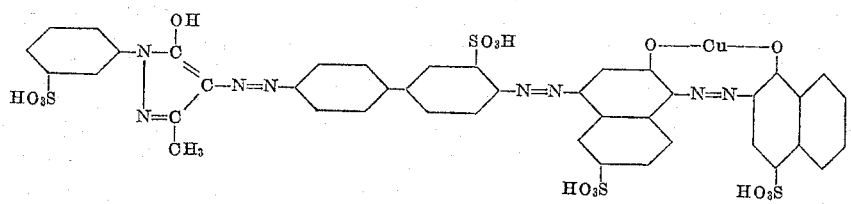

7. The metalliferous trisazo dyestuff of the formula

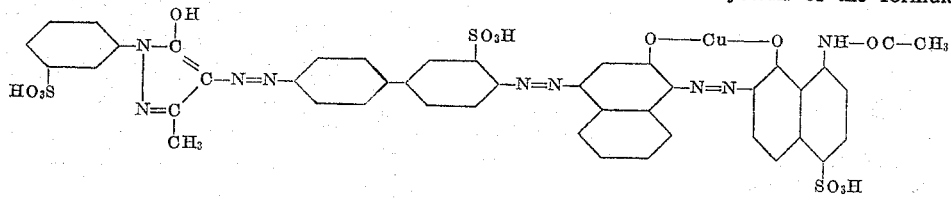

8. The metalliferous trisazo dyestuff of the formula

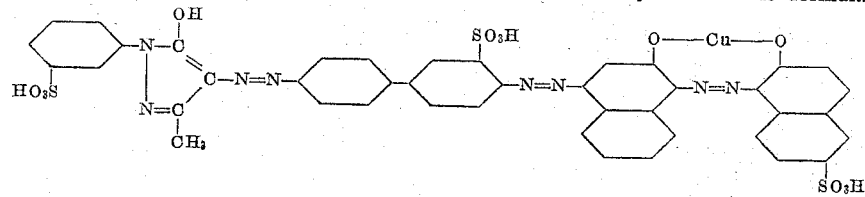

9. The metalliferous trisazo dyestuff of the formula

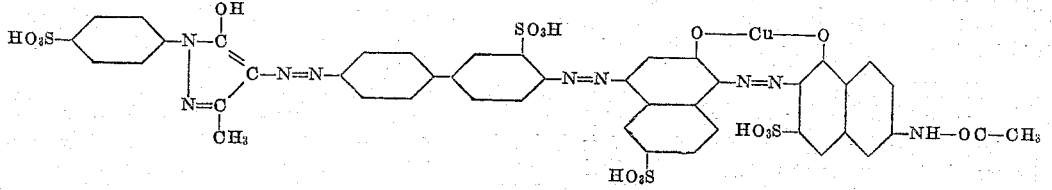

10. The metalliferous trisazo dyestuff of the formula

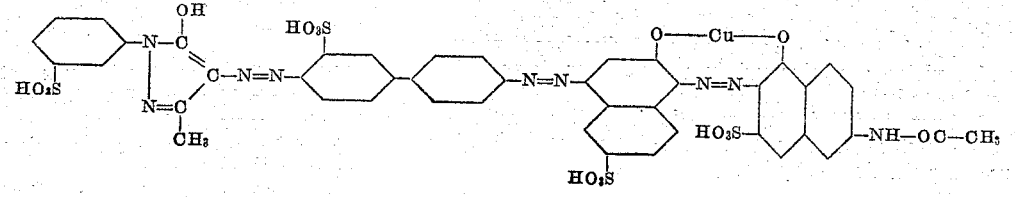

No references cited.